June 15, 1948.  H. M. BICKLE  2,443,294
DIPSTICK GAUGE
Original Filed April 3, 1943
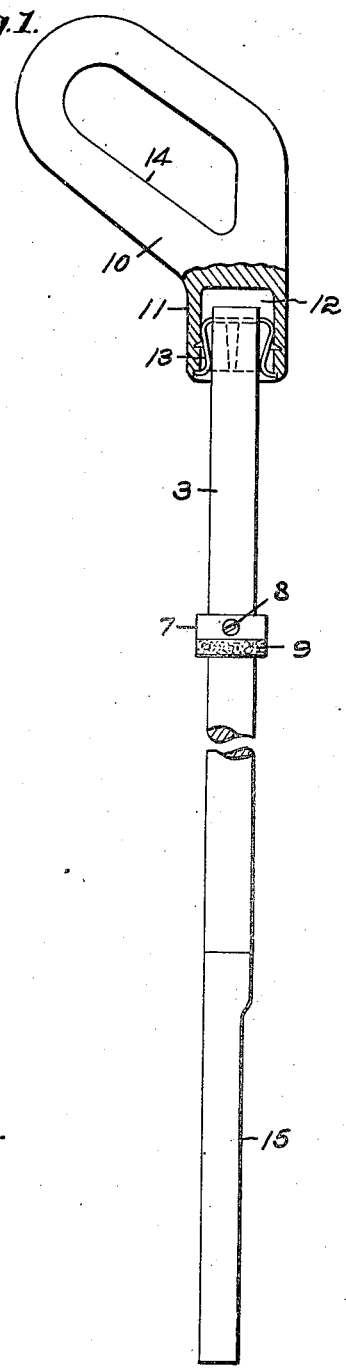
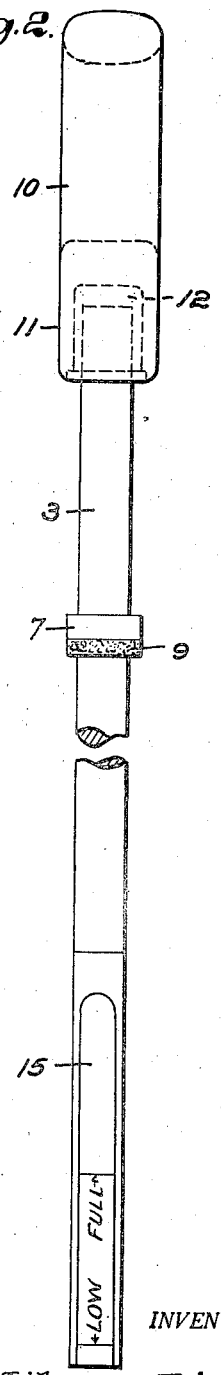
INVENTOR.
Harry Milman Bickle,
by Emery, Booth, Townsend, Miller & Weidner
Attys.

Patented June 15, 1948

2,443,294

UNITED STATES PATENT OFFICE 2,443,294

DIP STICK GAUGE

Harry Milman Bickle, Heston, England, assignor to Fram Corporation, East Providence, R. I., a corporation of Rhode Island Original application April 3, 1943, Serial No. 481,680. Divided and this application February 3, 1944, Serial No. 520,923. In Great Britain March 2, 1942

1 Claim. (Cl. 33—126.7)

This invention relates to dipsticks or gauges such for example as customarily used in connection with internal combustion engines to indicate the amount or level of the lubricating oil in the engine crankcase or sump, which devices may incorporate means for determining the degree of contamination of the oil in a crankcase or the like, as fully disclosed and claimed in my copending application Serial No. 481,680, filed April 3, 1943, which became Patent No. 2,343,168, issued February 29, 1944, of which this application is a division.

In the accompanying drawings illustrating by way of example one embodiment of the invention:

Fig. 1 is an elevational view of the device as a whole, with portions in section; and Fig. 2 is an elevation of the device of Fig. 1 with the same turned 90°.

Referring to the drawings in more detail, the improved gauge or so-called dipstick as there shown comprises an elongated body portion which in this instance is substantially cylindrical. The upper part 3 of the body portion is in the form of a rod of steel or other material.

The upper part 3 of the body portion of the dipstick is provided with a stop collar 7 which is preferably adjustably secured as by means of a set screw 8, whereby the depth to which the dipstick may be inserted into the crankcase may be determined as desired. The adjustable collar 7 may have a felt washer or the like 9 secured at its underface for sealing purposes.

The dipstick is provided at its upper end with a handle portion of "Bakelite" or other suitable material, herein separately and detachably formed and mounted. As here illustrated, such hande comprises a pistol grip portion 10 and an angularly related attaching portion 11 having a socket 12 adapted to receive and be affixed to the upper end of the upper body part 3 of the dipstick. Securing means is provided for the handle, herein comprising a spear clip or fastener as indicated at 13. The handle portion desirably is formed with one or more flat surfaces as at 14, Fig. 1, on which any desired indicia can be incorporated.

The lower part of the body portion of the dipstick may have a plane outer surface portion as at 15. Such surface portion 15 may have inscribed or otherwise applied on it suitable quantity indicia, as represented for example near the bottom of Fig. 2, to show the level of the oil in the crankcase.

My invention is not limited to the exemplary embodiment herein illustrated or described, its scope being set forth in the following claim.

I claim:

An oil-inspecting dipstick adapted to be inserted and withdrawably supported at an orifice admitting to a chamber for an oil supply to be examined, said dipstick comprising an elongated body portion including an oil immersible lower part and a connected longitudinal rod-like upper part, an angularly projecting pistol-grip handle element at the upper end of said body portion, said handle element including a grip proper and a socket formation at an angle thereto for seating on the upper end of the body portion, and spring clip connecting means on the socket-entering end of the upper part of the body portion and engageable with the latter for detachably intersecuring the handle element and body portion in different positions of angular adjustment about the axis of the body portion.

HARRY MILMAN BICKLE.

REFERENCES CITED

The following references are of record in the file of this patent:

UNITED STATES PATENTS

| Number | Name | Date |
| --- | --- | --- |
| 1,508,084 | Collis | Sept. 9, 1924 |
| 2,098,963 | Hexter | Nov. 16, 1937 |
| 2,127,835 | Tower | Aug. 23, 1938 |
| 2,224,123 | Wilson | Dec. 3, 1940 |
| 2,254,662 | Naples et al. | Sept. 2, 1941 |
| 2,343,168 | Bickle | Feb. 29, 1944 |